United States Patent
Chukka et al.

(10) Patent No.: US 11,356,911 B1
(45) Date of Patent: Jun. 7, 2022

(54) WIRELESS COMMUNICATION HANDOVER CONTROL BASED ON USER EQUIPMENT (UE) THROUGHPUT

(71) Applicant: T-MOBILE INNOVATIONS LLC, Overland Park, KS (US)

(72) Inventors: Chaitanya Chukka, Schaumburg, IL (US); Anoop Kumar Goyal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 128 days.

(21) Appl. No.: 16/988,885

(22) Filed: Aug. 10, 2020

(51) Int. Cl.
*H04W 4/00* (2018.01)
*H04W 36/00* (2009.01)
*H04W 64/00* (2009.01)
*H04W 36/08* (2009.01)

(52) U.S. Cl.
CPC ... *H04W 36/0085* (2018.08); *H04W 36/0058* (2018.08); *H04W 36/00835* (2018.08); *H04W 36/08* (2013.01); *H04W 64/003* (2013.01)

(58) Field of Classification Search
CPC . H04W 24/10; H04W 28/00; H04W 28/0284; H04W 28/0289; H04W 36/00; H04W 36/0005; H04W 36/0011; H04W 36/0016; H04W 36/0058; H04W 36/0061; H04W 36/0066; H04W 36/0072; H04W 36/0077; H04W 36/0083; H04W 36/00837; H04W 36/0085; H04W 36/0088; H04W 36/0094; H04W 36/30; H04W 36/38
See application file for complete search history.

(56) References Cited

U.S. PATENT DOCUMENTS

| | | | |
|---|---|---|---|
| 7,912,013 | B2 | 3/2011 | Qi et al. |
| 7,970,399 | B2 | 6/2011 | Sunderberg et al. |
| 8,615,241 | B2 | 12/2013 | Gupta et al. |
| 9,001,784 | B2 | 4/2015 | Ramachandran |
| 9,078,132 | B2 | 7/2015 | Nakamura |
| 9,635,595 | B2 | 4/2017 | Chen et al. |
| 9,661,515 | B2 | 5/2017 | Lord et al. |
| 9,661,545 | B2 | 5/2017 | Yavuz et al. |
| 9,706,478 | B2 | 7/2017 | Mitsui et al. |
| 10,104,585 | B2 | 10/2018 | Park et al. |
| 10,299,169 | B2 | 5/2019 | Wang et al. |

*Primary Examiner* — Matthew W Genack

(57) ABSTRACT

In a wireless communication network, an access node controller determines data throughput over a target access node. A source access node wirelessly exchanges user data with User Equipment (UE) and determines data throughput. The source access node receives signal parameters for the source access node and target access node from the UE. The source access node compares the signal parameters and responsively transfers a handover request that indicates the target node and the UE throughput over the source node. The access node controller receives the handover request and compares the source throughput to the target throughput to determine a handover value. The access node controller transfers the handover value to the source access node. The source access node compares the signal parameters based on the handover value, and responsively hands-over the UE to the target access node which wirelessly exchanges user data with the UE.

20 Claims, 9 Drawing Sheets

US 11,356,911 B1

WIRELESS COMMUNICATION HANDOVER CONTROL BASED ON USER EQUIPMENT (UE) THROUGHPUT

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices using wireless network protocols. Exemplary wireless network protocols include Fifth Generation New Radio (5GNR), Millimeter-Wave (MMW), Long Term Evolution (LTE), Institute of Electrical and Electronic Engineers (IEEE) 802.11 (WIFI), and Low-Power Wide Area Network (LP-WAN). The wireless communication networks deliver the wireless data service using various data throughputs that are often measured in bits per second on the downlink and/or uplink.

As a wireless user device moves about, the wireless signal from its serving access node weakens and a wireless signal from a target access node strengthens. The wireless user device measures and reports the signal quality of the target access node to the serving access node. The serving access node compares the signal quality difference between the source and target access nodes to determine when to handover the wireless user device to the target access node. The serving access node may process other values along with the signal quality like offsets and hysteresis. The offsets are adjustments for the serving cell, target cell, and target frequency.

The wireless access nodes are diversifying rapidly into different sizes and technologies. The older wireless access nodes are typically slower and larger than their newer counterparts. Some wireless user devices handover from the newer and faster access nodes to the older and slower access nodes based on a signal quality difference—the older nodes have better signal quality when the user devices are very close to them. The wireless user devices may get better signal quality but may also suffer from inferior data throughput from the older and slower access nodes. Unfortunately, the wireless communication networks do not efficiently and effectively help the wireless user devices remain on faster access nodes that have adequate signal quality instead of handing the user devices over to slower access nodes that have excellent signal quality.

TECHNICAL OVERVIEW

In a wireless communication network, an access node controller determines data throughput over a target access node. A source access node wirelessly exchanges user data with User Equipment (UE) and determines data throughput. The source access node receives signal parameters for the source access node and target access node from the UE. The source access node compares the signal parameters and responsively transfers a handover request that indicates the target node and the UE throughput over the source node. The access node controller receives the handover request and compares the source throughput to the target throughput to determine a handover value. The access node controller transfers the handover value to the source access node. The source access node compares the signal parameters based on the handover value, and responsively hands-over the UE to the target access node which wirelessly exchanges user data with the UE.

DETAILED DESCRIPTION

Figure 1:
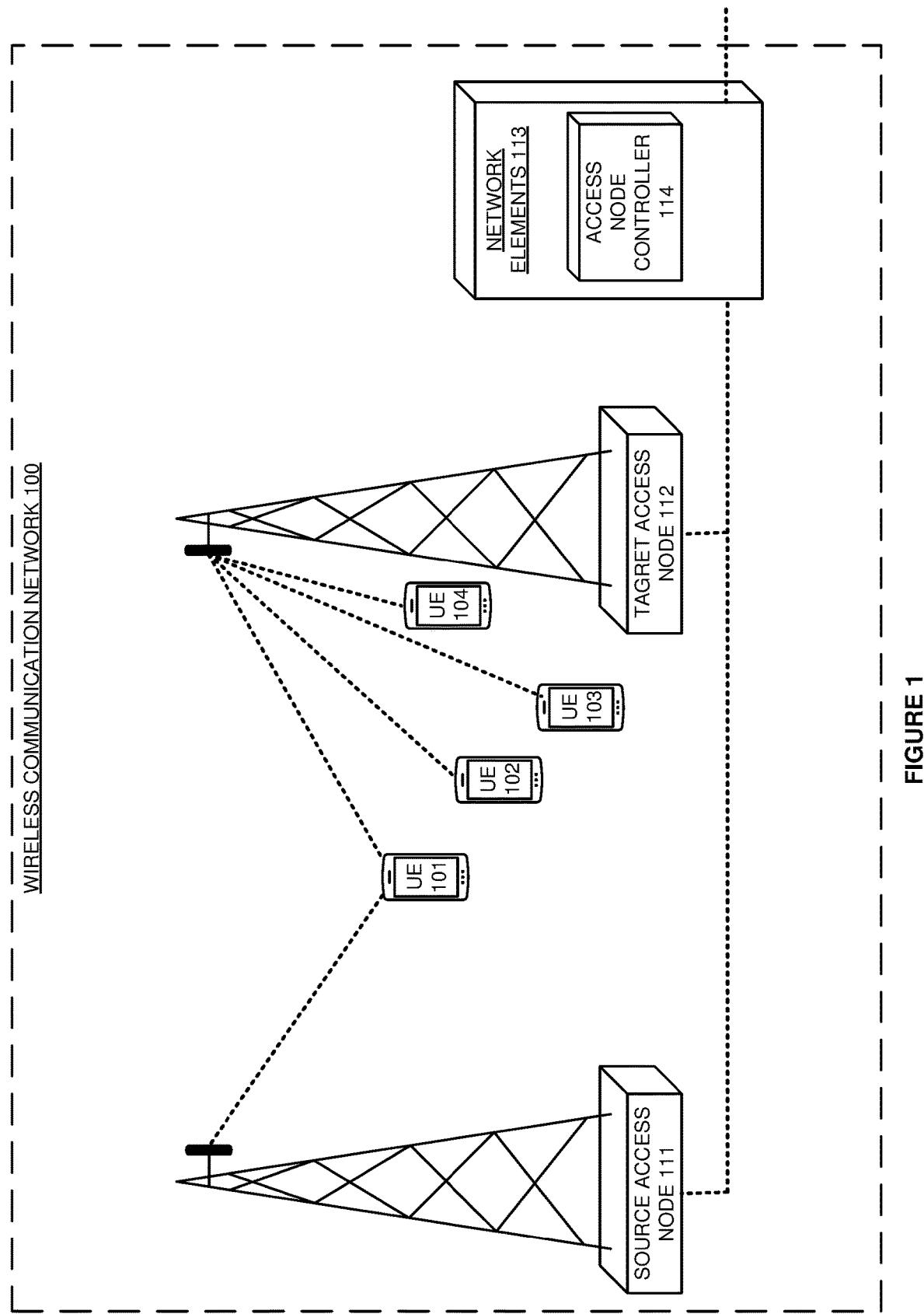
FIG. 1 illustrates a wireless communication network to control wireless User Equipment (UE) handovers based on UE throughput.

FIG. 1 illustrates wireless communication network 100 to control wireless User Equipment (UE) handovers based on UE throughput. Wireless communication network 100 delivers wireless data services like internet-access, video-calling, media-streaming, augmented-reality, machine-control, and/or some other wireless networking product. Wireless communication network 100 comprises wireless UEs 101-104, source access node 111, target access node 112, and network elements 113. Network elements 113 include access node controller 114. Various examples of network operation and configuration are described herein.

In some examples, target access node 112 wirelessly exchanges user data with UEs 102-104. Target access node 112 generates individual throughput data for UEs 102-104 for these data exchanges over target access node 112. Target access node 112 transfers the throughput data for UEs 102-104 to access node controller 114. Access node controller 114 processes the throughput data to determine average per-UE throughput for target access node 112. Contemporaneously, source access node 111 wirelessly exchanges user data with UE 101. Source access node 111 determines throughput for UE 101 over source access node 111. Access nodes 111-112 wirelessly broadcast pilot signals, and UE 101 wirelessly receives and measures the strength and quality of these pilot signals. UE 101 reports signal strength and quality parameters for access nodes 111-112 to source access node 111. Source access node 111 compares the source strength and/or quality parameters to the target strength and/or quality parameters—typically to determine the difference. Source access node 111 identifies a controller trigger based on the strength/quality comparisons.

In response to a controller trigger, source access node 111 transfers a handover request to access node controller 114 that indicates source access node 111, target access node 112, and the source UE throughput. Access node controller 114 receives the handover request and compares the source UE throughput to the target UE throughput—typically to determine the difference. In response, access node controller 114 determines a handover value like an offset or threshold based on the throughput comparison. Access node controller 114 transfers the handover value to source access node 111. Source access node 111 receives the handover value and compares the source strength/quality parameters and the target strength/quality parameters based on the handover value. In response to the strength/quality comparison based on the handover value, source access node 111 either hands-over UE 101 to target access node 112 or rejects the hand-over.

In some examples, source access node 111 determines a Quality-of-Service Flow Indicator (QFI) and/or a QoS Class Indicator (QCI) for UE 101. Source access node 111 identifies the controller trigger based on the QFI/QCI for UE 101 in addition to the strength comparison. For example, source access node 111 may reject handovers without signaling access node controller 114 when UE 101 is using QFI 1, but source access node 111 would request handover support from access node controller 114 for other QFIs.

In some examples, source access node 111 determines a geographic location of UE 101 relative to the geographic coverage area for access nodes 111-112. Source access node 111 may detect the controller trigger based on the geographic location of UE 101 and the strength/quality comparison. For example, source access node 111 may reject handovers without signaling access node controller 114 when UE 101 is located in the middle of source coverage and at the edge of target coverage.

In some examples, access node controller 114 modifies Preferred Roaming Lists (PRLs) that list target access node 112 based on the UE throughput comparison. The modification may increase or decrease the priority of access node 112 relative to other nodes in the PRLs. The modification may add or delete target access node 112 to/from the PRLs. Access node controller 114 transfers the modified PRL for delivery to UEs near target access node 112. Source access node 111 may receive the modified PRL and wirelessly transfer the modified PRL to UE 101.

UEs 101-104 wirelessly communicate with access nodes 111-112 over wireless links. The wireless links use Radio Access Technologies (RATs) like Fifth Generation New Radio (5GNR), Millimeter-Wave (MMW), Long Term Evolution (LTE), Institute of Electrical and Electronic Engineers (IEEE) 802.11 (WIFI), Low-Power Wide Area Network (LP-WAN), and/or some other protocol. The handovers may be intra-RAT or inter-RAT. The wireless links use electromagnetic frequencies in the low-band, mid-band, high-band, or some other portion of the electromagnetic spectrum. Access nodes 111-112 communicate with each other and with network elements 113 over data links. Network elements 113 communicate with external systems like the internet over data links. The data links use metal, glass, air, or some other media. The data links use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols.

Although UEs 101-104 are depicted as smartphones, UEs 101-104 might instead comprise computers, robots, vehicles, or some other data appliances with wireless communication circuitry. Access nodes 111-112 are depicted as towers, but access nodes 111-112 may use other mounting structures or no mounting structure at all. Access nodes 111-112 may comprise gNodeBs, eNodeBs, hot-spots, base-stations, and/or some other form of wireless network transceiver. Network elements 113 comprise Access and Mobility Management Functions (AMFs), User Plane Functions (UPFs), MMW controllers, Mobility Management Entities (MMEs), Gateways (GWs), Internet-of-Things (IoT) application servers, content-delivery servers, and/or some other form of wireless network apparatus. In some examples, network elements 113 (including node controller 114) comprise Virtual Network Functions (VNFs) in a Network Function Virtualization Infrastructure (NFVI).

UEs 101-104 and access nodes 111-112 each comprise antennas, amplifiers, filters, modulation, analog/digital interfaces, microprocessors, software, memories, transceivers, bus circuitry, and the like. Network elements 113 and node controller 114 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Figure 2:
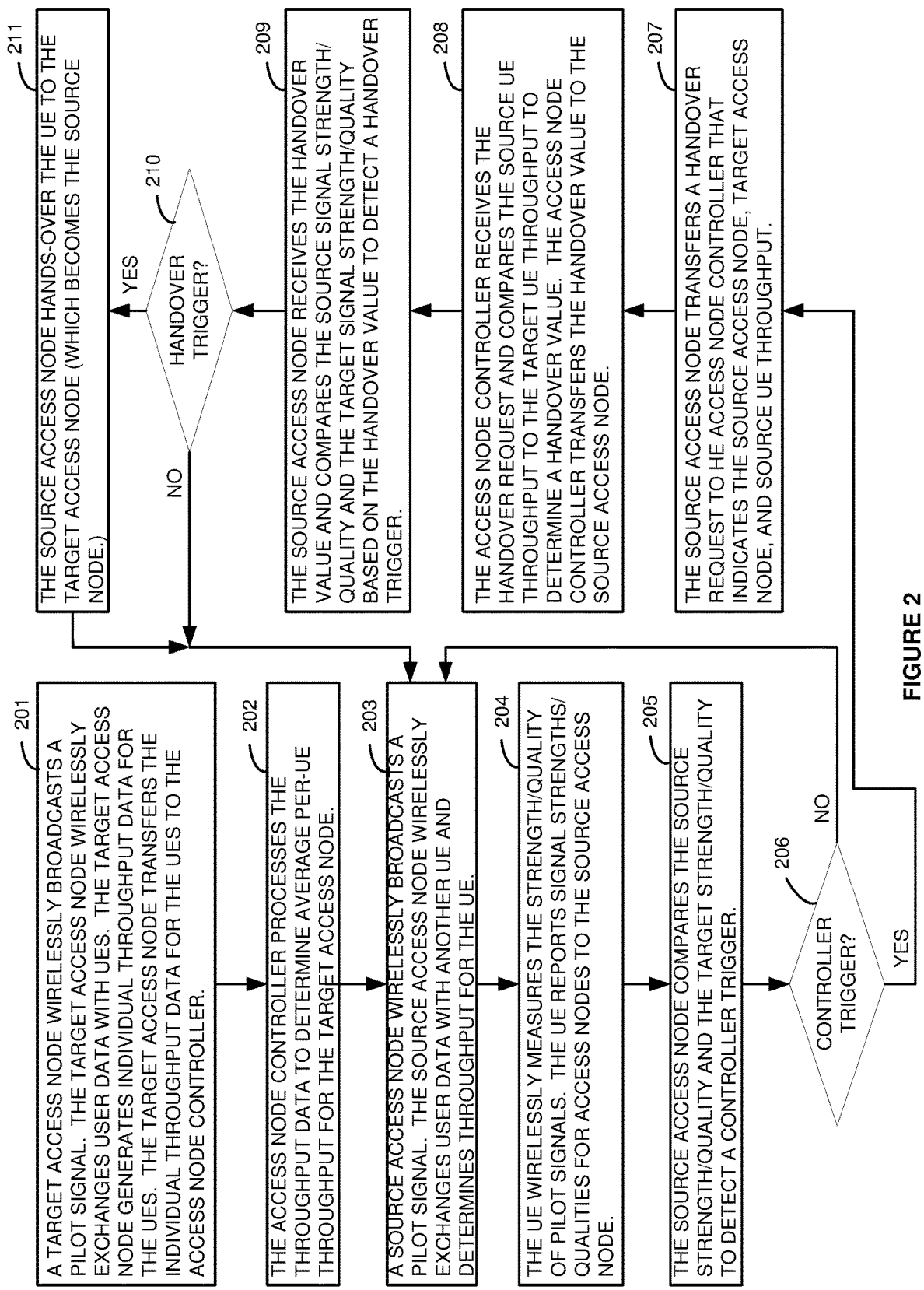
FIG. 2 illustrates an exemplary operation of the wireless communication network to control wireless UE handovers based on UE throughput.

FIG. 2 illustrates an exemplary operation of wireless communication network 100 to control wireless UE handovers based on UE throughput. A target access node wirelessly broadcasts a pilot signal (201). The target access node wirelessly exchanges user data with UEs (201). The target access node generates individual throughput data for the UEs and transfers the individual throughput data for the UEs to the access node controller (201). The access node controller processes the throughput data to determine average per-UE throughput for the target access node (202). The source access node wirelessly broadcasts a pilot signal (203). The source access node wirelessly exchanges user data with another UE and determines throughput for the UE (203). The UE wirelessly receives and measures the strength and quality of the pilot signals (204). The UE reports signal strengths and qualities for the access nodes to the source access node (204). To detect a controller trigger, the source access node compares the source signal strength to the target signal strength and/or compares the source signal quality to the target signal quality (205). In response to detecting a controller trigger (206), the source access node transfers a handover request to the access node controller that indicates the source access node, target access node, and source UE throughput (207). If the controller trigger is not detected (206), the operation repeats (203). The access node controller receives the handover request and compares the source UE throughput to the target UE throughput to determine a handover value (208). The access node controller transfers the handover value to the source access node (208). The source access node receives the handover value and compares the source signal strength and/or quality to the target signal strength and/or quality based on the handover value to detect a handover trigger (209). In response to detecting the handover trigger (210), the source access node hands-over the UE to the target access node, and the target access node becomes the source access node (210). If the handover trigger is not detected (210) or after the handover (211), the operation repeats (203) although the initial operations (201-202) are typically repeated with different sets of UEs.

Figure 3:
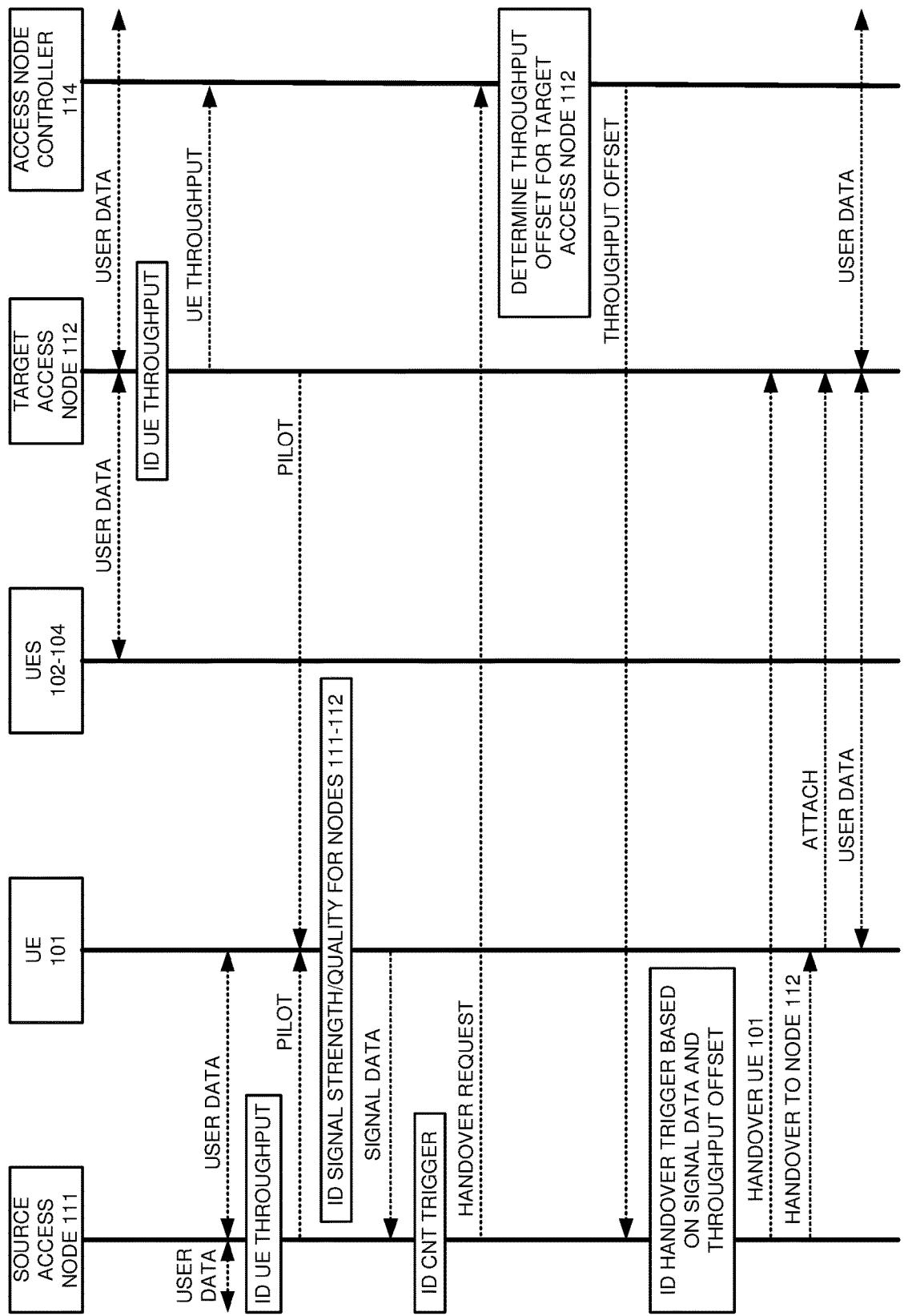
FIG. 3 illustrates an exemplary operation of the wireless communication network to control wireless UE handovers based on UE throughput.

FIG. 3 illustrates an exemplary operation of wireless communication network 100 to control wireless UE handovers based on UE throughput. UEs 102-104 wirelessly exchange user data with target access node 112. Target access node 112 exchanges the user data with network elements 113. Target access node 112 generates individual throughput data for UEs 102-104 for the data exchanges and transfers the individual throughput data for UEs 102-104 to access node controller 114. Access node controller 114 processes the throughput data to determine average per-UE throughput for target access node 112. Source access node 111 wirelessly exchanges user data with UE 101. Source access node 111 determines throughput for UE 101. Access nodes 111-112 wirelessly broadcast pilot signals, and UE 101 wirelessly measures the strength and quality of these pilot signals. UE 101 reports signal data (strength and quality parameters) for access nodes 111-112 to source access node 111. To identify a controller trigger, source access node 111 compares the source strength parameter to the target strength parameter and/or compares the source quality parameter to the target quality parameter. In response to a controller trigger, source access node 111 transfers a handover request to access node controller 114 that indicates source access node 111, target access node 112, and the source UE throughput. Access node controller 114 receives the handover request and compares the source UE throughput to the target UE throughput to determine a handover value like an offset or threshold. Access node controller 114 transfer the handover value to source access node 111. Source access node 111 receives the handover value and compares the source signal strength/quality parameters to the target signal strength/quality parameters based on the handover value. Source access node 111 may reject the handover of UE 101 in response to the strength/quality comparison based on the handover value, but in this example, source access node 111 hands-over UE 101 to target access node 112 in response to the strength/quality comparison based on the handover value by signaling target access node 112 to serve UE 101 and by signaling UE 101 to attach to target access node 112. UE 101 attaches to target access node 112, and target access node 112 exchanges user data with UE 101.

Figure 4:
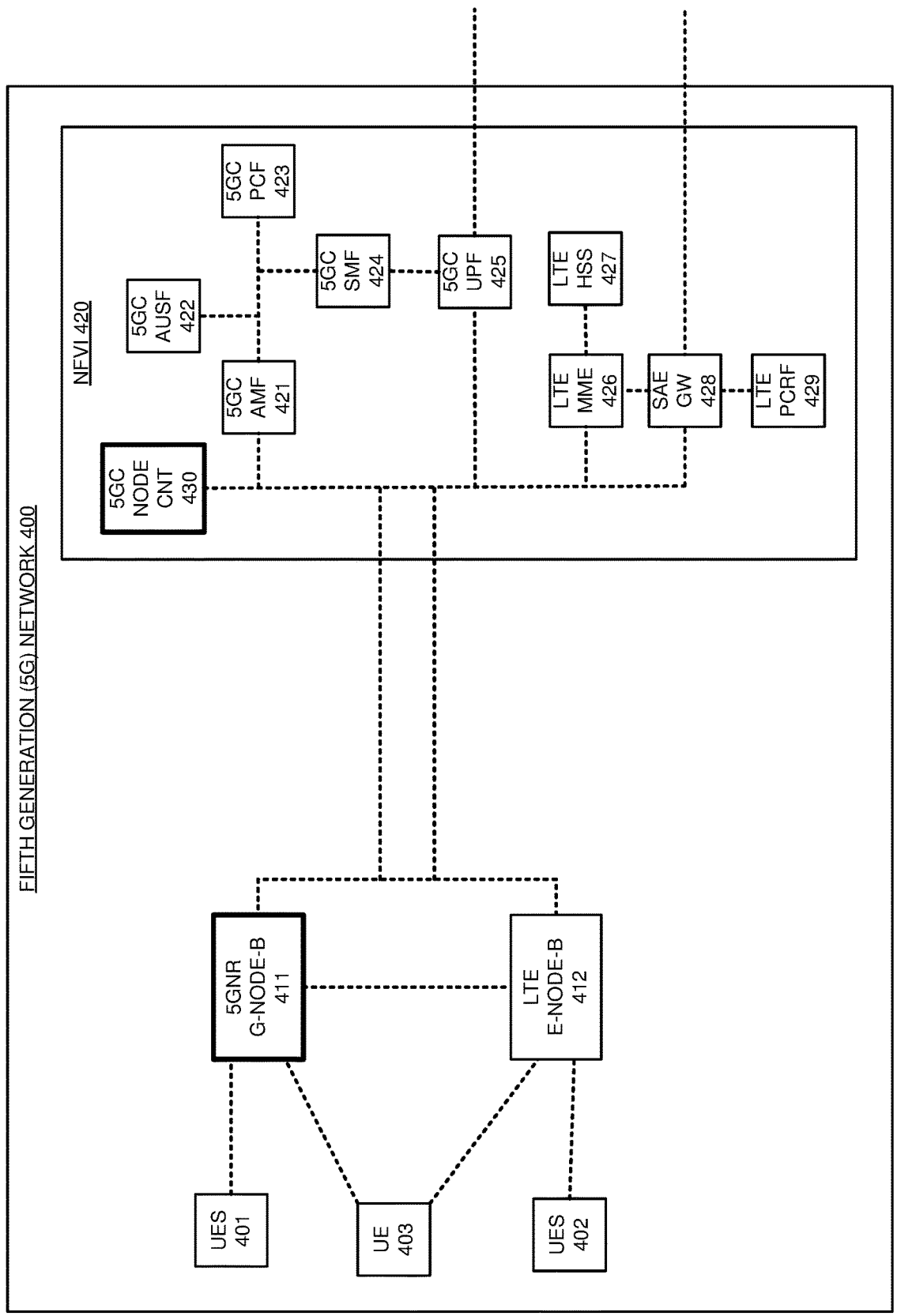
FIG. 4 illustrates a Fifth Generation (5G) network to control wireless UE handovers based on UE throughput.

FIG. 4 illustrates a Fifth Generation (5G) network 400 to control wireless UE handovers based on UE throughput. 5G wireless communication network 400 comprises an example of wireless communication network 100, although network 100 may differ. 5G wireless communication network 400 comprises UEs 401-403, Fifth Generation New Radio (5GNR) gNodeB 411, Long Term Evolution (LTE) 412, and Network Function Virtualization Infrastructure (NFVI) 420. NFVI 420 comprises Fifth Generation Core (5GC) Access and Mobility Management Function (AMF) 421, 5GC Authentication and Security Function (AUSF) 422, 5GC Policy Control Function (PCF) 423, 5GC Session Management Function (SMF) 424, 5GC User Plane Function (UPF) 425, LTE Mobility Management Entity (MME) 426, LTE Home Subscriber System (HSS) 427, System Architecture Evolution Gateway (SAE GW) 428, LTE Policy Charging Rules Function (PCRF) 429, and 5GC node controller (HO CNT) 430.

LTE eNodeB 412 wirelessly delivers wireless data services that have Quality-of-Service Class Identifiers (QCIs) to UEs 402. LTE eNodeB 412 determines its throughput for UEs 402 and transfers the throughput data for UEs 402 to 5GC node controller 430. Node controller 430 processes the throughput data to determine the average throughput per-UE for LTE eNodeB 412. The throughput could be for the uplink, downlink, or a composite of both.

5GNR gNodeB 411 wirelessly delivers wireless data services that have Quality-of-Service Flow Identifiers (QFIs) to UEs 402-403. 5GNR gNodeB 411 determines its throughput for UE 403. 5GNR gNodeB 411 and LTE eNodeB 412 wirelessly broadcast pilot signals. UE 403 measures the strength and quality of the pilot signals. UE 403 reports Received Signal Receive Power (RSRP) and Received Signal Receive Quality (RSRQ) for 5GNR gNodeB 411 and RSRP and RSRQ for LTE eNodeB 412 to 5GNR gNodeB 411.

5GNR gNodeB 413 determines the difference between the RSRPs and/or the RSRQs for NodeBs 411-412 to detect a controller trigger and exchange signaling with 5GC access node controller 430. 5GNR gNodeB 413 may use an A3 controller trigger: [(eNodeB RSRP/RSRQ+eNodeB frequency offset+eNodeB cell offset−hysteresis) is greater than (gNodeB RSRP/RSRQ+gNodeB cell offset)]. 5GNR gNodeB 413 may use a B2 controller trigger: [(gNodeB RSRP+hysteresis) is less than a serving threshold and (eNodeB RSRP/RSRQ+eNodeB frequency offset−hysteresis) is greater than a neighbor threshold]. When the A3, B2, or other controller trigger is detected, 5GNR gNodeB 411 may check the QFI and/or UE location to reject the handover without transferring a handover request to 5GC node controller 430. 5GNR gNodeB 411 may check the QFI for UE 403 against a positive and/or negative QFI list to reject or proceed with the handover request. For example, 5GNR gNodeB 411 may reject a handover when UE 403 is using QFI 1. 5GNR gNodeB 411 may reject a handover when UE 403 is mid-sector for gNodeB 411, but UE 403 is edge-sector for eNodeB 412.

5GC node controller 430 receives the handover request from 5GNR gNodeB 411 that indicates 5GNR gNodeB 411, LTE eNodeB 412, and UE throughput for 5GNR gNodeB 411. 5GC node controller 430 compares the source UE throughput to the target UE throughput to determine a throughput offset for eNodeB 412 based on the throughput comparison. 5GC node controller 430 transfers the throughput offset for LTE eNodeB 412 to 5GNR gNodeB 411. 5GC node controller 430 may also modify Preferred Roaming Lists (PRLs) that are distributed to UEs that are near LTE eNodeB 412 to add/remove LTE eNodeB 412 or to raise/lower the priority of LTE eNodeB 412 relative to other access nodes.

5GNR gNodeB 411 receives the throughput offset for LTE eNodeB 412. 5GNR gNodeB 411 determines the difference between the RSRPs and/or the RSRQs for NodeBs 411-412 based on the throughput offset to detect a handover trigger. 5GNR gNodeB 413 may use the A3 handover trigger: [(eNodeB RSRP/RSRQ+eNodeB frequency offset+eNodeB cell offset+eNodeB 412 throughput offset−hysteresis) is greater than (gNodeB RSRP/RSRQ+gNodeB cell offset)]. 5GNR gNodeB 413 may use the B2 handover trigger: [(gNodeB RSRP+hysteresis) is less than a serving threshold and (eNodeB RSRP/RSRQ+eNodeB frequency offset+eNodeB 412 throughput offset−hysteresis) is greater than a neighbor threshold]. When the A3, B2, or other handover trigger is detected, 5GNR gNodeB 411 signals eNodeB 412 to serve UE 403. 5GNR gNodeB 411 signals UE 403 attach to LTE eNodeB 412. 5GNR gNodeB 4111 signals 5GC AMF 421 that UE has attached to LTE eNodeB 412. 5GC AMF 421 signals LTE MME 426 to serve UE 403 over LTE eNodeB 412 using QCIs that correspond to the QFIs used by UE 403. LTE MME 426 signals LTE eNodeB 412 to serve UE 403 using the QCIs. LTE MME 426 signals SAE GW 428 to serve UE 403 over LTE eNodeB 412 using the QCIs. LTE eNodeB 412 wirelessly delivers wireless data services that have QCIs which correspond to the QFIs previously used by UE 403. SAE GW 428 delivers the wireless data services to UE 403 using the QCIs.

Figure 5:
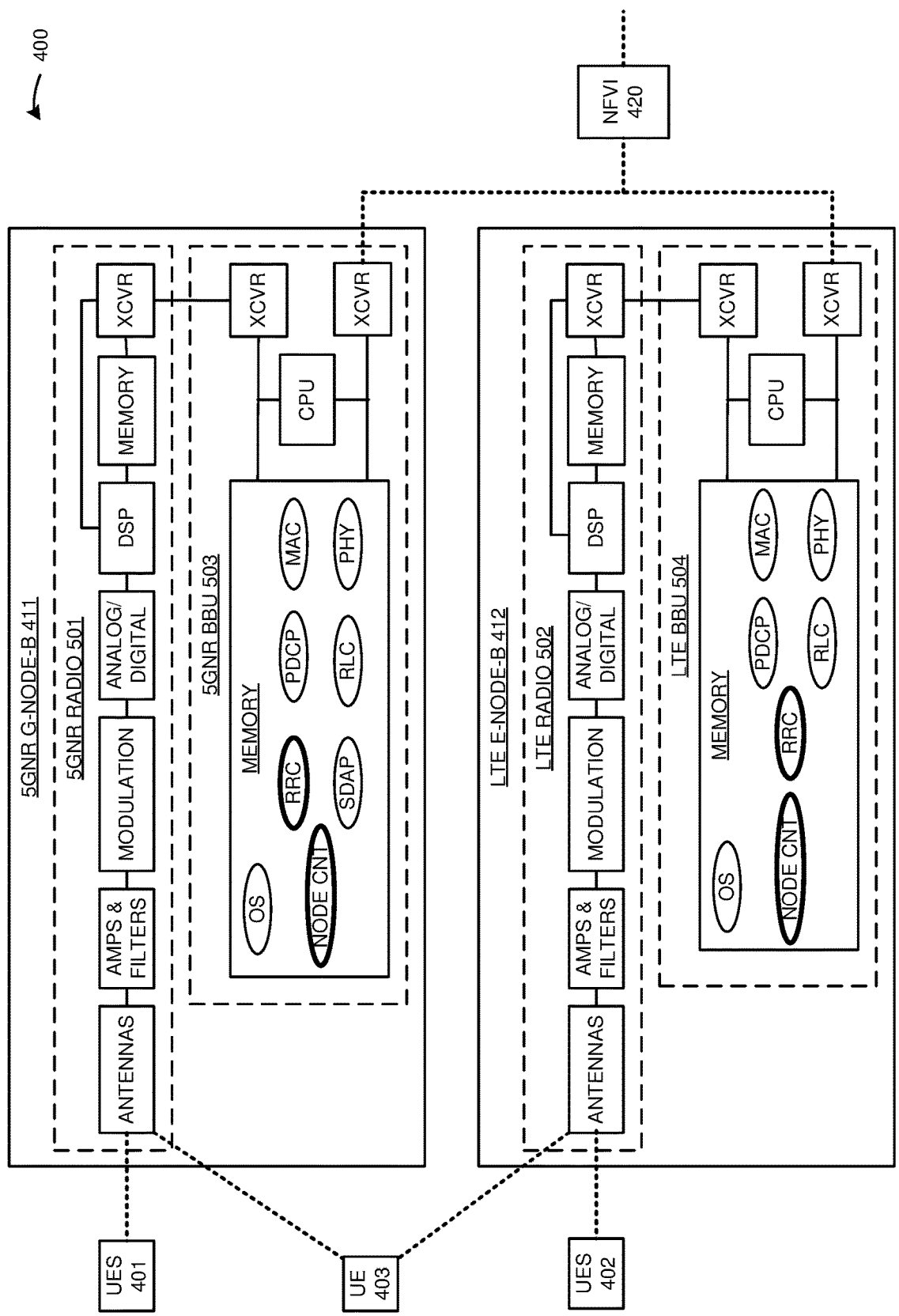
FIG. 5 illustrates 5G New Radio (NR) NodeB and Long Term Evolution (LTE) eNodeB to control UE handovers based on UE throughput.

FIG. 5 illustrates 5GNR gNodeB 411 and LTE eNodeB 412 to control UE handovers based on UE throughput. NodeBs 411-412 comprise an example of wireless access nodes 111-112, although access nodes 111-112 may differ. 5GNR gNodeB 411 comprises 5GNR radio 501 and 5GNR BBU 503. LTE eNodeB 412 comprises LTE radio 502 and LTE BBU 504. Radios 501-502 comprise antennas, amplifiers, filters, modulation, analog-to-digital interfaces, DSP, memory, and transceivers that are coupled over bus circuitry. BBUs 503-504 comprise memory, CPU, and transceivers that are coupled over bus circuitry. The memories in BBUs 503-504 store operating systems and network applications like Physical Layer (PHY), Media Access Control (MAC), Radio Link Control (RLC), Packet Data Convergence Protocol (PDCP), Radio Resource Control (RRC), Service Data Adaptation Protocol (SDAP), node control (NODE CNT). The CPU in BBUs 503-504 execute the operating systems, PHYs, MACs, RLCs, PDCPs, SDAPs, RRCs, and node controllers to exchange signaling and user data with UE 403 and to exchange signaling and user data with NFVI 420. UEs 401 and 403 are wirelessly coupled to the antennas in 5GNR radio 501 over 5GNR links. UEs 402-403 are wirelessly coupled to the antennas in LTE radio 502 over LTE links. A transceiver in 5GNR radio 501 is coupled to a transceiver in 5GNR BBU 503 over CPRI links. A transceiver in LTE radio 502 is coupled to a transceiver in LTE BBU 504 over CPRI links. Transceivers in BBUs 503-504 are coupled each other over X2 links and to NFVI 420 over backhaul links.

In radios 501-502, the antennas receive wireless signals from UEs 401-403 that transport UL signaling and UL data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSPs. The DSPs recover UL symbols from the UL digital signals. The CPUs execute the network applications to process the UL symbols and recover the UL signaling and the UL data. The RRCs processes the UL signaling and DL signaling from NFVI 420 to generate new UL signaling and new DL signaling. The RRCs transfer the new UL signaling to AMF 421 or MME 426. The SDAPs and PDCPs transfer corresponding UL data to NFVI 420.

In BBUs 503-504, the RRCs receive the DL signaling from NFVI 420. The SDAPs and PDCPs s receive DL data from UPF 425 or SAE GW 428 in NFVI 420. The network applications process the new DL signaling and the DL data to generate corresponding DL symbols that carry the DL signaling and DL data. In radios 501-502, the DSPs processes the DL symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless signals to UEs 401-403 that transport the DL signaling and DL data.

RRC functions comprise authentication, security, handover control, status reporting, Quality-of-Service (QoS), network broadcasts and pages, and network selection. SDAP functions include packet marking and QoS enforcement. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

LTE eNodeB 412 wirelessly delivers wireless data services that have QCIs to UEs 402. LTE BBU 504 determines its throughput for UEs 402 and transfers the throughput data for UEs 402 to the node to 5GC node controller 430 in NFVI 420. 5GNR gNodeB 411 wirelessly delivers wireless data services that have QFIs to UEs 401 and 403. 5GNR BBU 503 determines data throughput for UE 403. 5GNR BBU 503 wirelessly broadcasts a pilot signal over 5GNR radio 501, and LTE BBU 504 wirelessly broadcasts a pilot signal over LTE radio 502. UE 403 measures the strength and quality of the pilot signals. UE 403 and reports RSRP and RSRQ for 5GNR gNodeB 411 and LTE eNodeB 412 to 5GNR BBU 503.

5GNR BBU 503 determines the difference between the RSRPs and/or the RSRQs for NodeBs 411-412 to detect a controller trigger. In response to the controller trigger, 5GNR BBU 503 exchanges signaling with 5GC access node controller 430 in NFVI 420. 5GNR BBU 503 may use the A3 controller trigger: [(eNodeB RSRP/RSRQ+eNodeB frequency offset+eNodeB cell offset−hysteresis) is greater than (gNodeB RSRP/RSRQ+gNodeB cell offset)]. 5GNR BBU 503 may use the B2 controller trigger: [(gNodeB RSRP+hysteresis) is less than a serving threshold and (eNodeB RSRP/RSRQ+eNodeB frequency offset−hysteresis) is greater than a neighbor threshold]. When the A3, B2, or other controller trigger is detected, 5GNR BBU 503 may check the QFI and/or UE location and reject the handover before (and without) transferring signaling to node controller 430 in NFVI 420. 5GNR BBU 503 may check the QFI for UE 403 against a positive and/or negative QFI list and then reject or proceed with the handover request based on the list(s). In some examples, 5GNR BBU 503 rejects that handover after detecting the A3 or B2 controller trigger when UE 403 is using QFIs 1-3. In other examples, 5GNR BBU 503 rejects the handover after detecting the A3 or B2 controller trigger based on UE location—UE 403 is located mid-sector for gNodeB 411 but is located edge-sector for eNodeB 412.

In some scenarios, 5GNR BBU 503 transfers a handover request for UE 403 to 5GC node controller 430 in NFVI 420. The handover request indicates 5GNR gNodeB 411, LTE eNodeB 412, and UE 403 throughput over gNodeB 411. In response to the handover request, 5GNR BBU 503 receives a throughput offset from 5GC node controller 430 in NFVI 420. 5GNR BBU 503 determines the difference between the RSRPs and/or the RSRQs for NodeBs 411-412 based on the eNodeB 411 throughput offset to detect a handover trigger. 5GNR BBU 503 may use the A3 handover trigger: [(eNodeB RSRP/RSRQ+eNodeB frequency offset+eNodeB cell offset+eNodeB 412 throughput offset–hysteresis) is greater than (gNodeB RSRP/RSRQ+gNodeB cell offset)]. 5GNR BBU 503 may use a B2 handover trigger: [(gNodeB RSRP+hysteresis) is less than a serving threshold and (eNodeB RSRP/RSRQ+eNodeB frequency offset+eNodeB 412 throughput offset–hysteresis) is greater than a neighbor threshold]. When the A3, B2, or other handover trigger is detected, 5GNR BBU 503 signals LTE eNodeB 412 over an X2 link to serve UE 403. 5GNR BBU 503 signals UE 403 over 5GNR radio 501 attach to LTE eNodeB 412. 5GNR BBU 503 signals AMF 421 in NFVI 420 that UE is attaching to LTE eNodeB 412. LTE BBU 504 receives signaling from MME 426 in NFVI 420 to serve UE 403. LTE gNodeB 412 wirelessly delivers wireless data services to UE 403, and the data services have QCIs which correspond to the QFIs formerly used by UE 403.

Figure 6:
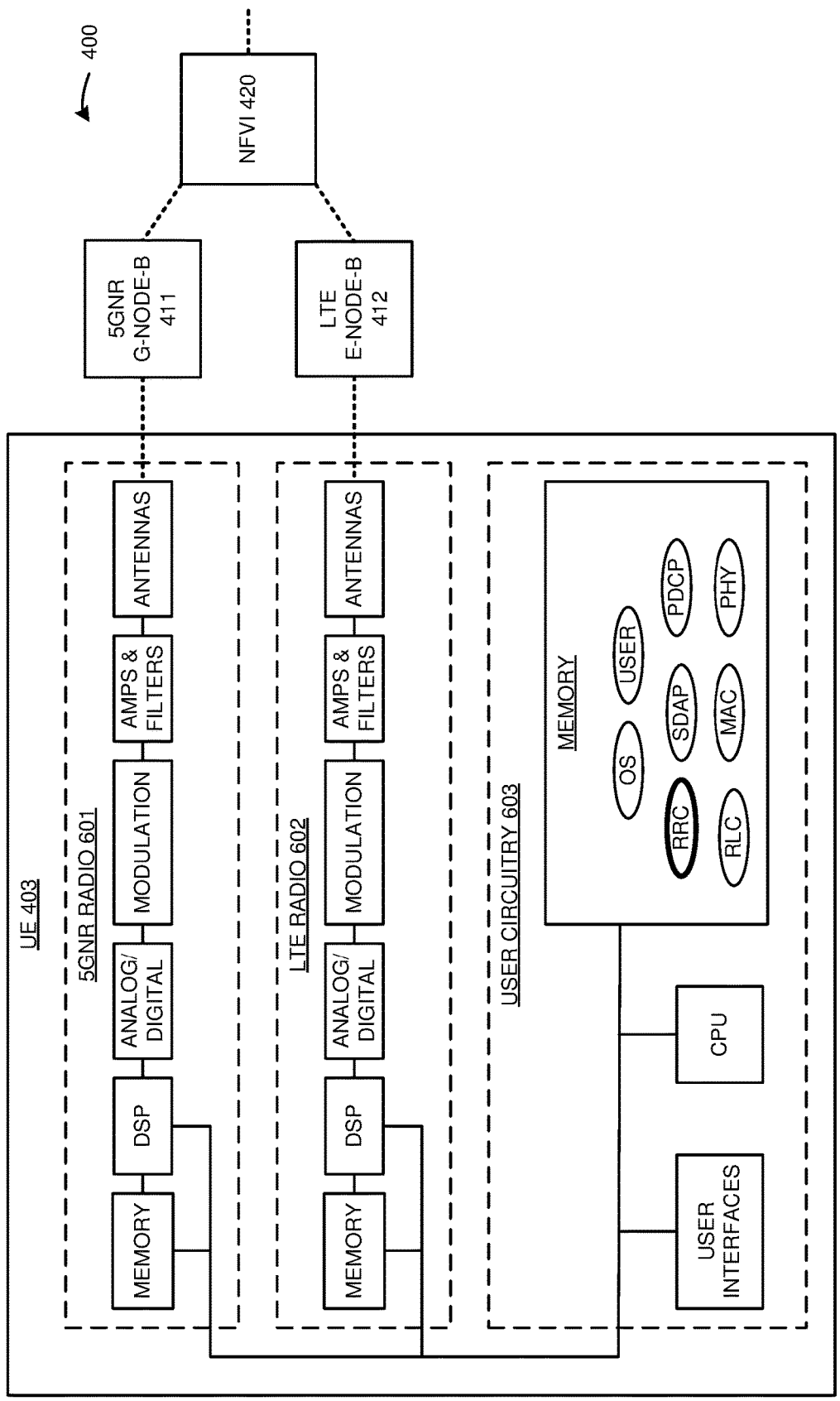
FIG. 6 illustrates the wireless UE that is handed-over based on UE throughput.

FIG. 6 illustrates wireless UE 403 that is handed-over based on UE throughput. UE 403 comprises 5GNR radio 601, LTE radio 602, and user circuitry 603 that are coupled over bus circuitry. Radios 601-602 comprise antennas, amplifiers, filters, modulation, analog-to-digital interfaces, DSP, and memory that are coupled over bus circuitry. User circuitry 603 comprises user interfaces, CPU, and memory that are coupled over bus circuitry. UE 403 is an example of UEs 101-104, although UEs 101-104 may differ.

The antennas in radios 601-602 are wirelessly coupled to NodeBs 411-412. The user interfaces in user circuitry 603 comprise graphic displays, machine controllers, sensors, cameras, transceivers, and/or some other user components. The memory in user circuitry 603 stores an operating system, user applications (USER), and network applications (PHY, MAC, RLC, PDCP, SDAP, and RRC). The CPU in user circuitry 603 executes the operating system and the user applications to generate and consume user data. The CPU in user circuitry 603 executes the operating system and the network applications to wirelessly exchange corresponding network signaling and user data with NodeBs 411-412 over radios 601-602.

In radios 601-602, the antennas receive wireless signals from NodeBs 411-412 that transport DL network signaling and DL user data. The antennas transfer corresponding electrical DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSPs. The DSPs recovers DL symbols from the DL digital signals. The CPUs execute the network applications to process the DL symbols and recover the DL network signaling and the DL user data. The RRCs process the DL network signaling and user signaling from the operating system to generate new UL network signaling and new DL user signaling. The network applications process the new UL network signaling and the UL user data to generate corresponding UL symbols that carry the UL network signaling and UL user data. In radios 601-602, the DSP processes the UL symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless signals to NodeBs 411-412 that transport the UL network signaling and UL user data.

RRC functions comprise authentication, security, handover control, status reporting, QoS, network broadcasts and pages, and network selection. SDAP functions include packet marking and QoS enforcement. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

UE 403 wirelessly receives wireless data services that have QFIs from 5GNR gNodeB 411. UE 403 measures the strength and quality of the pilot signals from 5GNR gNodeB 411 and LTE eNodeB 412. UE 403 reports RSRP and RSRQ for 5GNR gNodeB 411 and LTE eNodeB 412 to 5GNR gNodeB 411. UE 403 receives signaling from 5GNR gNodeB 411 to attach to LTE eNodeB 412. UE 403 attaches to LTE eNodeB 412. LTE eNodeB 412 wirelessly delivers wireless data services to UE 403 that have QCIs which correspond to its former QFIs.

Figure 7:
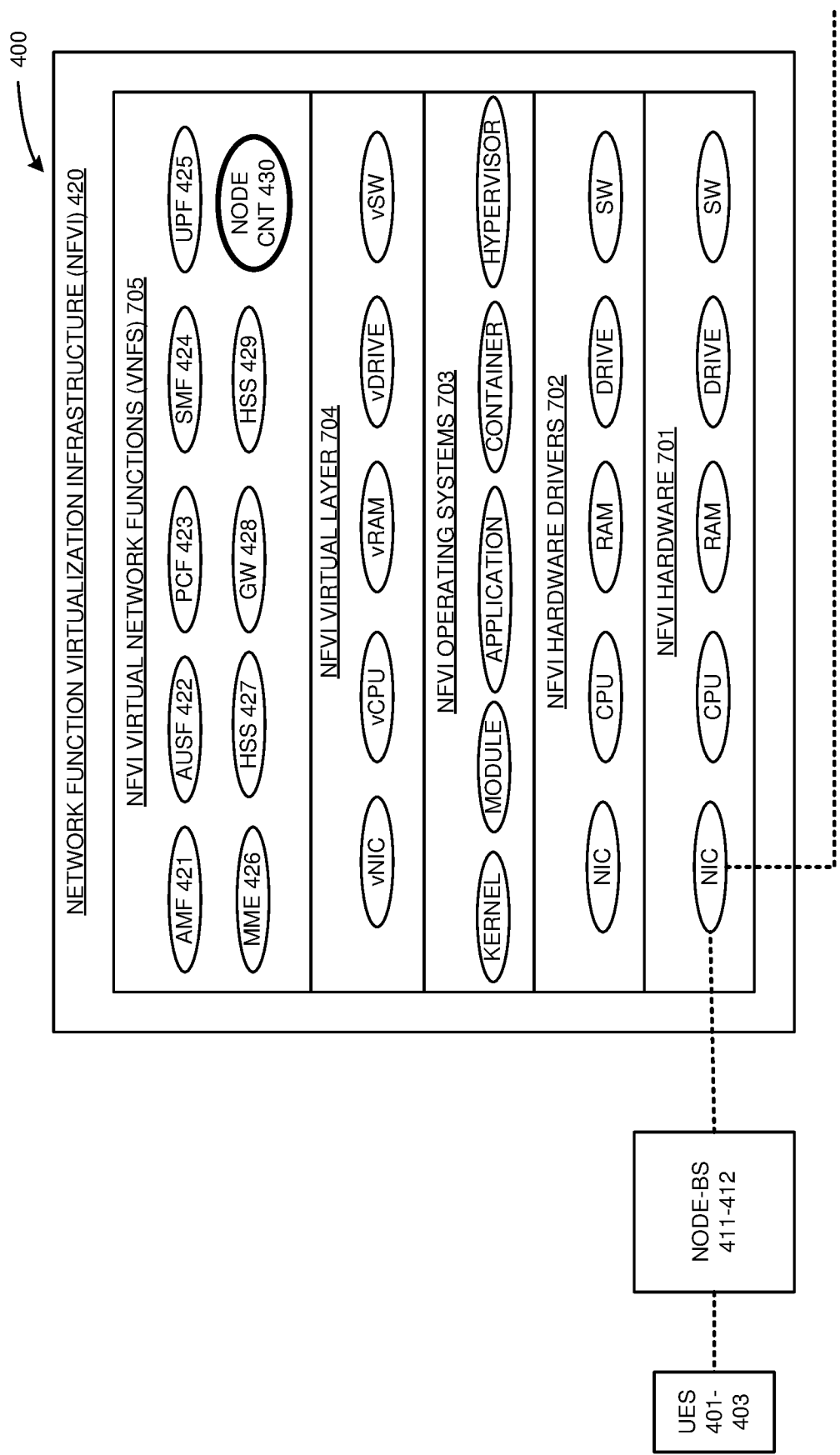
FIG. 7 illustrates a Network Function Virtualization Infrastructure (NFVI) having a node controller to control UE handovers based on UE throughput.

FIG. 7 illustrates Network Function Virtualization Infrastructure (NFVI) 420 having a node controller to control UE handovers based on UE throughput. NFVI 420 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NIC), CPU, RAM, flash/disk drives, and data switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises virtual NICs (vNIC), virtual CPUs (vCPU), virtual RAM (vRAM), virtual Drives (vDRIVE), and virtual Switches (vSW). NFVI VNFs 705 comprise AMF 421, AUSF 422, PCF 423, SMF 424, UPF 425, MME 426, HSS 427, SAE GW 428, PCRF 429, and node controller 430. Other VNFs are typically present but are omitted for clarity. The NIC are coupled to NodeBs 411-412 and to external systems. NFVI hardware 701 executes NFVI hardware drivers 702, NFVI operating systems 703, NFVI virtual layer 704, and NFVI VNFs 705 to serve UEs 401-403 over NodeBs 411-412.

5GC node controller 430 receives throughput data for LTE eNodeB 412 and UEs 402. 5GC node controller 430 processes the throughput data to determine the average throughput per-UE for LTE eNodeB 412. The throughput could be for the uplink, downlink, or a composite of both. 5GC node controller 430 receives a handover request from 5GNR gNodeB 411 that indicates 5GNR gNodeB 411, LTE eNodeB 412, and UE throughput for 5GNR gNodeB 411.

5GC node controller 430 compares the source UE throughput to the target per-UE throughput to determine a throughput offset for LTE eNodeB 412 based on the throughput comparison. 5GC node controller 430 transfers the throughput offset for LTE eNodeB 412 to 5GNR gNodeB 411. 5GC node controller 430 may also modify Preferred Roaming Lists (PRLs) that are distributed to UEs that are near LTE eNodeB 412 to add/remove LTE eNodeB 412 or to raise/lower the priority of LTE eNodeB 412 relative to other access nodes.

5GC AMF 421 receives signaling from 5GNR gNodeB 411 that UE has attached to LTE eNodeB 412. 5GC AMF 421 signals LTE MME 426 to serve UE 403 over LTE eNodeB 412 using QCIs that correspond to the old QFIs. LTE MME 426 signals LTE eNodeB 412 to serve UE 403 using the QCIs. LTE MME 426 signals SAE GW 428 to serve UE 403 over LTE eNodeB 411 using the QCIs. LTE gNodeB 412 wirelessly delivers wireless data services to UE 403 that have the QCIs that correspond to the old QFIs for UE 403. SAE GW 428 delivers the wireless data services to UE 403 that have the QCIs.

Figure 8:
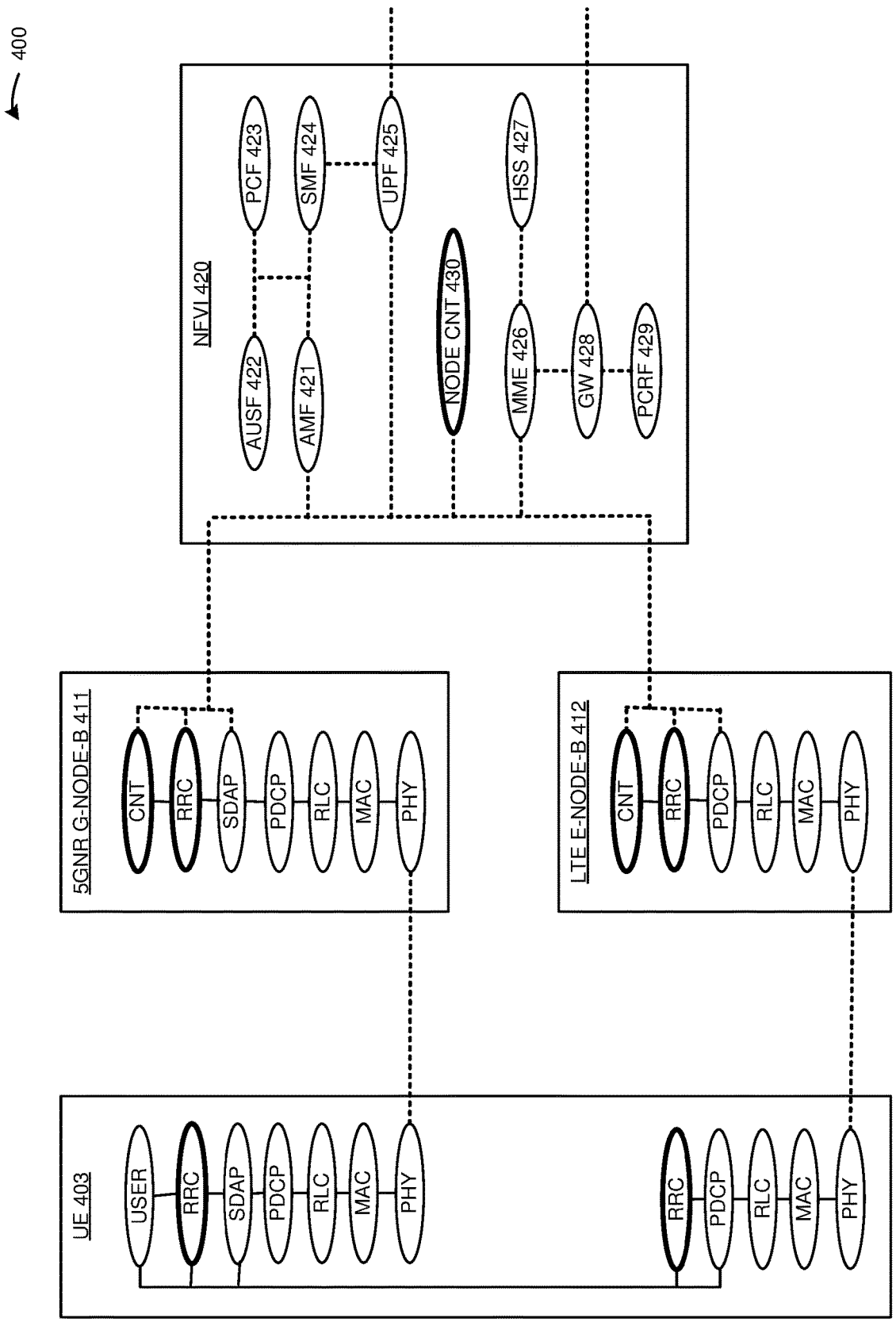
FIG. 8 illustrates an exemplary operation of the 5G network to control the wireless UE handovers based on UE throughput.

FIG. 8 illustrates an exemplary operation of 5G wireless communication network 400 to handover wireless UE 403 based on UE throughput. The RRCs in NodeBs 411-412 determine throughput metrics like average throughput per UE over the last 30 days. The RRCs transfer their per-UE throughput metrics to their local node controller application (CNT). The node controller applications may perform some performance measurements as well. The node controller applications transfer their per-UE performance metrics to 5GC node controller 430.

LTE eNodeB 412 wirelessly delivers wireless data services that have QCIs to UEs 402. The LTE RRC in LTE eNodeB 412 determines throughput for UEs 402 and transfers the throughput data for UEs 402 to the node control application (CNT). The node controller application transfers the throughput data for UEs 402 to 5GC node controller 430. Node controller 430 processes the throughput data to determine the average throughput per-UE for LTE eNodeB 412. The throughput could be for the uplink, downlink, or a composite of both.

The RRC in UE 403 attaches to the RRC in 5GNR gNodeB 411 over the 5GNR PDCPs, RLCs, MACs, and PHYs. The RRC in 5GNR gNodeB 411 transfers N2 signaling for UE 403 to 5GC AMF 421. AMF 421 interacts with AUSF 422 and the RRC in UE 403 (over the RRC in gNodeB 411) to authenticate and authorize UE 403 for wireless data services. AMF 421 interacts with PCF 423 and SMF 424 to select QFIs for the wireless data services. AMF 421 signals the QFIs and network addresses for the wireless data services for UE 403 to the RRC in 5GNR gNodeB 411. The RRC in 5GNR gNodeB 411 signals the QFIs and network addresses for the wireless data services to the RRC in UE 403.

The 5GNR PHY in UE 403 measures the RSRP and RSRQ for 5GNR gNodeB 411. The LTE PHY in UE 403 measures the RSRP and RSRQ for LTE eNodeB 412. The 5GNR RRC in UE 403 reports the RSRPs and RSRQs for NodeBs 411-412 to the 5GNR RRC in gNodeB 411.

5GNR gNodeB 411 wirelessly delivers wireless data services that have QFIs to UE 403. The 5GNR RRC in gNodeB 411 determines its average data throughput for UE 403. The RRCs in NodeBs 411-412 wirelessly broadcast pilot signals. UE 403 measures and reports RSRP and RSRQ for NodeBs 411-412 to the 5GNR RRC in 5GNR gNodeB 411. The 5GNR RRC in 5GNR gNodeB 411 detects a controller trigger. The 5GNR RRC may use the A3 controller trigger: [(eNodeB RSRP/RSRQ+eNodeB frequency offset+eNodeB cell offset−hysteresis) is greater than (gNodeB RSRP/RSRQ+gNodeB cell offset)]. The 5GNR RRC may use the B2 controller trigger: [(gNodeB RSRP+hysteresis) is less than a serving threshold and (eNodeB RSRP/RSRQ+eNodeB frequency offset−hysteresis) is greater than a neighbor threshold]. When the A3, B2, or other controller trigger is detected, the node controller application in 5GNR gNodeB 411 typically checks the QFI and/or UE location to possibly reject the handover without signaling handover controller 430. The node controller application may reject handovers when UEs are using voice or video conferencing QFIs. The node controller application may reject handovers when UEs are close to gNodeB 411 but far from eNodeB 412. The node controller application transfers the handover request to 5GC node controller 430 after then controller trigger when no rejections based on QFI or location are encountered.

5GC node controller 430 receives the handover request from the node controller application in 5GNR gNodeB 411. The handover request indicates 5GNR gNodeB 411, LTE eNodeB 412, and UE throughput for 5GNR gNodeB 411. 5GC node controller 430 compares the source UE throughput for gNodeB 411 to the target per-UE throughput for eNodeB 412 to determine a throughput offset. 5GC node controller 430 transfers the throughput offset for LTE eNodeB 412 to the node controller application in 5GNR gNodeB 411.

In 5GNR gNodeB 411, the node controller application receives the throughput offset for LTE eNodeB 412 and transfers the offset to the 5GNR RRC. The 5GNR RRC in 5GNR gNodeB 411 then detects a handover trigger or rejects the handover based on the throughput offset for LTE eNodeB 412. The 5GNR RRC may use the A3 handover trigger: [(eNodeB RSRP/RSRQ+eNodeB frequency offset+eNodeB cell offset+eNodeB 412 throughput offset−hysteresis) is greater than (gNodeB RSRP/RSRQ+gNodeB cell offset)]. The 5GNR RRC may use the B2 handover trigger: [(gNodeB RSRP+hysteresis) is less than a serving threshold and (eNodeB RSRP/RSRQ+eNodeB frequency offset+eNodeB 412 throughput offset−hysteresis) is greater than a neighbor threshold]. When the A3, B2, or other handover trigger is detected, the 5GNR RRC in 5GNR gNodeB 411 signals the LTE RRC in eNodeB 412 over the X2 link to serve UE 403. The RRC in 5GNR gNodeB 411 signals the 5GNR RRC in UE 403 attach to LTE eNodeB 412. The 5GNR RRC in UE 403 signals the LTE RRC in UE 403 to attach to the LTE RRC in LTE eNodeB 412. The 5GNR RRC in 5GNR gNodeB 411 signals 5GC AMF 421 that UE has attached to LTE eNodeB 412. 5GC AMF 421 signals LTE MME 426 to serve UE 403 over LTE eNodeB 412 using corresponding QCIs. LTE MME 426 signals the LTE RRC in LTE eNodeB 412 to serve UE 403. LTE MME 426 signals SAE GW 428 to serve UE 403 over LTE eNodeB 412. LTE gNodeB 412 wirelessly delivers wireless data services to UE 403 that have QCIs that correspond to the QFIs. SAE GW 428 delivers the wireless data services to UE 403 that have the QCIs.

Figure 9:
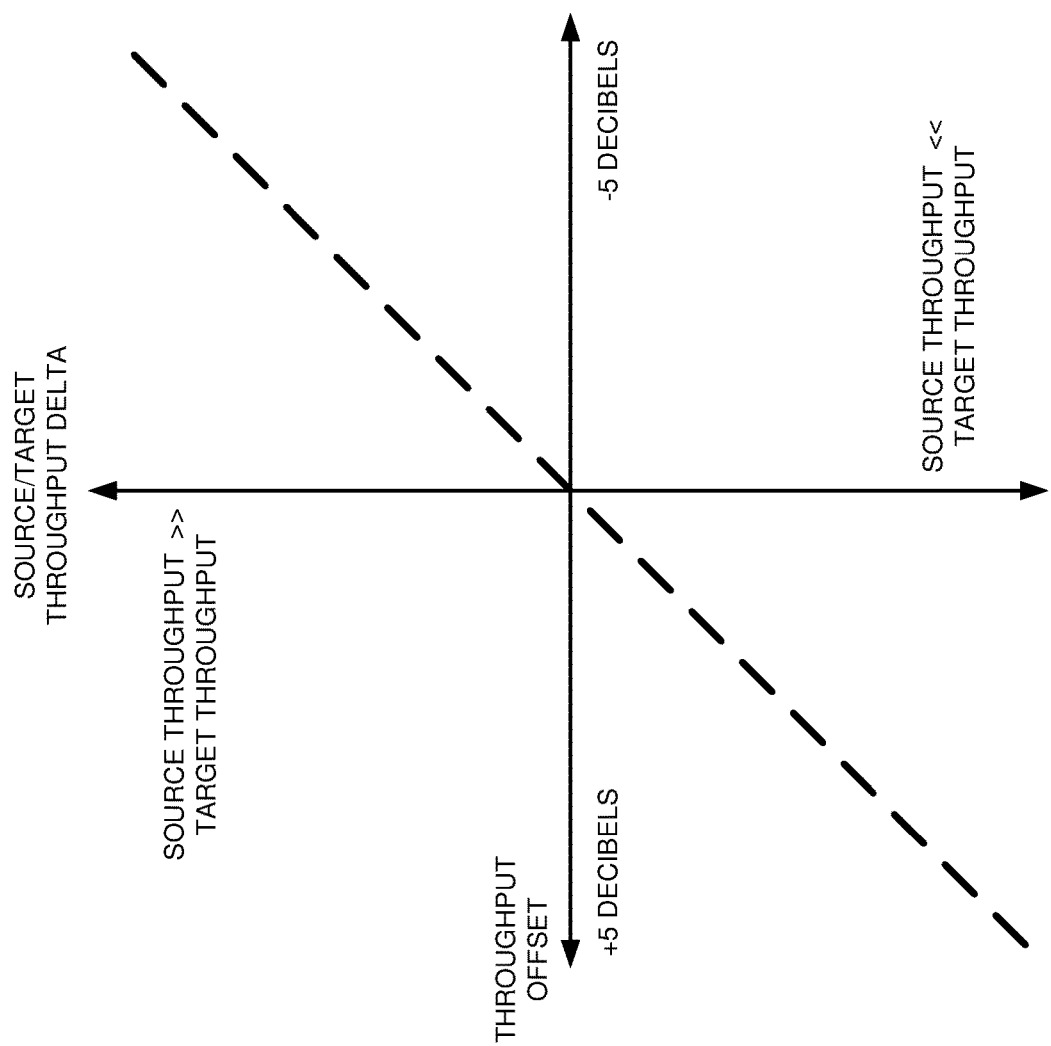
FIG. 9 illustrates an exemplary operation to determine throughput offsets to control the wireless UE handovers based on UE throughput.

FIG. 9 illustrates an exemplary operation to determine throughput offsets to control wireless UE handovers based on UE throughput. The vertical axis represents the difference between the source data throughput and the target data throughput. The top of the vertical axis has source throughput much greater than target throughput. The bottom of the vertical axis has target throughput much greater than source throughput. The horizontal axis represents the throughput offset for the source target pair. The left of the horizontal axis has a high throughput offset of positive five decibels. The right of the horizontal axis has a low throughput offset of negative five decibels.

The diagonal dashed line indicates the throughput offset based on the throughput difference. When the source data throughput is greater than the target data throughput, the throughput offset is relatively high to inhibit the handover. When the source data throughput is lower than the target data throughput, the throughput offset is relatively low to stimulate the handover. The diagram of FIG. 9 could be reduced to a data structure that is hosted by 5GC node controller 430 and used to determine throughput offsets. 5GC node controller 430 would host like data structures for other NodeB pairs.

The wireless data network circuitry described above comprises computer hardware and software that form special-purpose network circuitry to handover wireless UEs based on UE throughput. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to handover wireless UEs based on UE throughput.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to control a handover of a User Equipment (UE) from a source access node to a target access node, the method comprising:
    an access node controller receiving throughput data from the target access node and determining target UE throughput over the target access node;
    a source access node wirelessly exchanging user data with the UE, determining source UE throughput for the UE over the source access node, wirelessly receiving a source signal parameter for the source access node and a target signal parameter for the target access node from the UE, comparing the source signal parameter and the target signal parameter, identifying a controller trigger based on the signal parameter comparison, and responsively transferring a handover request that indicates the target access node and the source UE throughput;
    the access node controller receiving the handover request, comparing the source UE throughput to the target UE throughput, determining a handover value based on the UE throughput comparison, and transferring the handover value; and
    the source access node receiving the handover value, comparing the source signal parameter and the target signal parameter based on the handover value, and handing-over the UE to the target access node responsive to the signal parameter comparison based on the handover value.

2. The method of claim 1 wherein the handover value comprises a target throughput offset.

3. The method of claim 1 wherein the handover comprises an inter Radio Access Technology (RAT) handover.

4. The method of claim 1 wherein the handover comprises an intra Radio Access Technology (RAT) handover.

5. The method of claim 1 further comprising the source access node determining a Quality-of-Service Flow Indicator (QFI) for the UE and wherein the source access node identifying the controller trigger comprises identifying the controller trigger based on both the QFI for the UE and the signal parameter comparison.

6. The method of claim 1 further comprising the source access node determining a Quality-of-Service Class Indicator (QCI) for the UE and wherein the source access node identifying the controller trigger comprises identifying the controller trigger based on both the QCI for the UE and the signal parameter comparison.

7. The method of claim 1 further comprising the source access node determining a geographic location of the UE and a geographic coverage area for the target access node, and wherein the source access node identifying the controller trigger comprises identifying the controller trigger based on the geographic location of the UE, the geographic coverage area for the target access node, and the signal parameter comparison.

8. The method of claim 1 further comprising the source access node determining a geographic location of the UE and a geographic coverage area for the source access node, and wherein the source access node identifying the controller trigger comprises identifying the controller trigger based on the geographic location of the UE, the geographic coverage area for the source access node, and the signal parameter comparison.

9. The method of claim 1 further comprising the access node controller modifying a Preferred Roaming List (PRL) having the target access node based on the UE throughput comparison and transferring the modified PRL.

10. The method of claim 1 further comprising:
the access node controller modifying a Preferred Roaming List (PRL) having the target access node based on the UE throughput comparison and transferring the modified PRL; and
the source access node receiving the modified PRL and wirelessly transferring the modified PRL to the UE.

11. A wireless communication network to control a handover of a User Equipment (UE) from a source access node to a target access node, the wireless communication network comprising:
an access node controller configured to receive throughput data from the target access node and determine target UE throughput over the target access node;
a source access node configured to wirelessly exchange user data with the UE, determine source UE throughput for the UE over the source access node, wirelessly receive a source signal parameter for the source access node and a target signal parameter for the target access node from the UE, compare the source signal parameter and the target signal parameter, identify a controller trigger based on the signal parameter comparison, and responsively transfer a handover request that indicates the target access node and the source UE throughput;
the access node controller configured to receive the handover request, compare the source UE throughput to the target UE throughput, determine a handover value based on the UE throughput comparison, and transfer the handover value; and
the source access node configured to receive the handover value, compare the source signal parameter and the target signal parameter based on the handover value, and handover the UE to the target access node responsive to the signal parameter comparison based on the handover value.

12. The wireless communication network of claim 11 wherein the handover value comprises a target throughput offset.

13. The wireless communication network of claim 11 wherein the handover comprises an inter Radio Access Technology (RAT) handover.

14. The wireless communication network of claim 11 wherein the handover comprises an intra Radio Access Technology (RAT) handover.

15. The wireless communication network of claim 11 comprising the source access node configured to determine a Quality-of-Service Flow Indicator (QFI) for the UE and identify the controller trigger based on both the QFI for the UE and the signal parameter comparison.

16. The wireless communication network of claim 11 comprising the source access node configured to determine a Quality-of-Service Class Indicator (QCI) for the UE and identify the controller trigger based on both the QCI for the UE and the signal parameter comparison.

17. The wireless communication network of claim 11 comprising the source access node configured to determine a geographic location of the UE and a geographic coverage area for the target access node and identify the controller trigger based on the geographic location of the UE, the geographic coverage area for the target access node, and the signal parameter comparison.

18. The wireless communication network of claim 11 comprising the source access node configured to determine a geographic location of the UE and a geographic coverage area for the source access node and identify the controller trigger based on the geographic location of the UE, the geographic coverage area for the source access node, and the signal parameter comparison.

19. The wireless communication network of claim 11 further comprising the access node controller configured to modify a Preferred Roaming List (PRL) having the target access node based on the UE throughput comparison and transfer the modified PRL.

20. The wireless communication network of claim 11 further comprising:
the access node controller configured to modify a Preferred Roaming List (PRL) having the target access node based on the UE throughput comparison and transfer the modified PRL; and
the source access node configured to receive the modified PRL and wirelessly transfer the modified PRL to the UE.

* * * * *